Jan. 10, 1961  B. E. AMERINE  2,967,733
ROLLABLE TARPAULIN FOR OPEN TRUCK AND CAR BODIES
Filed July 28, 1958  2 Sheets-Sheet 1

INVENTOR.
BROUGH E. AMERINE

Jan. 10, 1961   B. E. AMERINE   2,967,733
ROLLABLE TARPAULIN FOR OPEN TRUCK AND CAR BODIES
Filed July 28, 1958   2 Sheets-Sheet 2

INVENTOR.
BROUGH E. AMERINE.
BY Hiram T. Sturges
Agent

United States Patent Office 2,967,733
Patented Jan. 10, 1961

2,967,733

ROLLABLE TARPAULIN FOR OPEN TRUCK AND CAR BODIES

Brough E. Amerine, R.R. 1, Box 42, Satanta, Kans.

Filed July 28, 1958, Ser. No. 751,394

2 Claims. (Cl. 296—98)

This invention relates to covers for truck bodies and railroad cars of the open type, as used for hauling cargo in bulk, such as grain, and also machinery and tools, and other cargo, and in particular a sheet of material, such as canvas anchored at one end to the body of a vehicle and rolled upon a shaft with ends of the shaft extended through slots in rails on the upper edges of side walls of the body and provided with sprockets that are positioned to mesh with chains in the rails whereby the cover is actuated to open and closed positions by rotating the shaft and wherein the shaft is rotated by cables trained over a double pulley on one end of the shaft.

The purpose of this invention is to provide a cover for truck and railway car bodies of the open type in which the cover is designed to be rolled upon a shaft to open the body and actuated to a position for closing the body by a single operator.

Open bodies are used universally on trucks and railway cars for hauling grain and other products in bulk on farms, and from farms to storage bins, mills, and the like, because the open upper portion facilitates loading and unloading the products. With the products exposed to the elements considerable grain is damaged by rain, and much grain is lost by wind storms.

With this thought in mind this invention contemplates an improved mounting for securing a tarpaulin or other cover over an open vehicle body whereby products in the body are protected from the elements in which the cover is extended over the body to provide a closure, and withdrawn to open the body by a hand crank or by an electric motor, either of which may be positioned at one side of the body.

The primary object of this invention is, therefore, to provide means for mounting a cover on a vehicle body of the open type in which the cover is designed to be extended over the body to provide a closure therefor, and withdrawn to open the body by a single operator.

Another object of the invention is to provide a cover for an open vehicle body wherein the cover is attached to the body along the sides and ends so that the possibility of products in the body being damaged or lost by the elements is obviated.

A further object of the invention is to provide means for mounting a cover on a vehicle body wherein the cover is suspended by mechanical means so that it is not dragged over products in the body.

A still further object is to provide a tarpaulin to be used as a cover for open motor vehicle and railway car bodies in which the tarpaulin is rolled on a shaft rotatably mounted in upper edges of side walls of the body whereby the cover is rolled to open and closed positions by a single operator, and in which the cover and mounting means therefor, are of simple and economical construction.

With these and other objects and advantages in view the invention embodies a sheet of canvas or the like having spaced grommets in the edges, a shaft to which one end of the sheet is secured and upon which the sheet is rolled, rails having elongated slots therein positioned on upper edges of side walls of a truck or car body, sprockets on ends of the shaft which extend through the slots of the rails, chains in the rails and meshing with the sprockets, cables extended on sides of the sheet of canvas and threaded through the grommets, and operating cables trained over pulleys on one end of the shaft.

Other features and advantages of the invention will appear from the following description taken in connection with the drawings, wherein.

Figure 1:
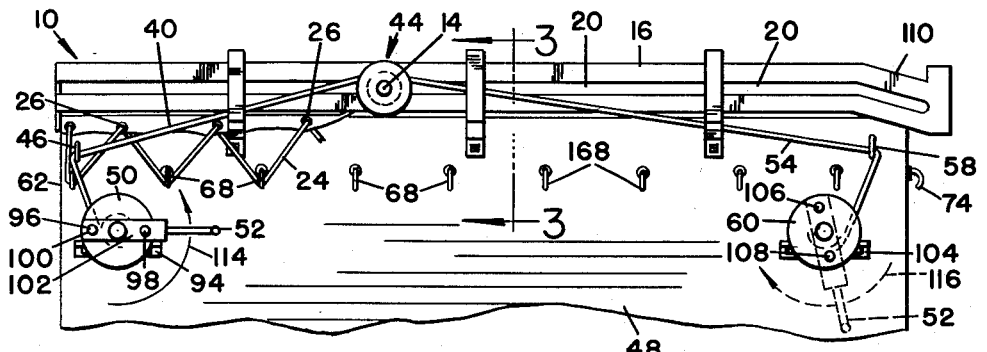
Figure 1 is a side elevational view of the upper portion of the side wall of a vehicle body with the mounting means of a cover installed on the side wall, and with parts broken away.

While one embodiment of the invention is illustrated in the above-referred-to drawings, it is to be understood that they are merely for the purpose of illustration, and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and the numeral 10 refers to the invention in its entirety, numeral 12 indicating a sheet of material, such as canvas, providing a tarpaulin, numeral 14 a shaft upon which the tarpaulin or cover is positioned, numerals 16 and 18 rails having slots 20 and 22 therein mounted on upper edges of side walls of a vehicle body, the rails being positioned whereby ends of the shaft extend through the slots 20 and 22, numeral 24 a cable threaded through grommets 26 on one side of the cover, numeral 28 a cable threaded through grommets 30 in the opposite side of the body, numerals 32 and 34 sprockets mounted on ends of the shaft and positioned in meshing relation with chains 36 and 38 in the rails 16 and 18, respectively, numeral 40 a cable trained over a section 42 of a double pulley 44 on the shaft 14 and extended through an eye 46 on the side wall 48 of a truck body to a pulley 50 rotatably mounted on the side wall 48 and positioned to be actuated by a hand crank 52 to draw the shaft 14 and cover toward the inner end of the body, and numeral 54 a cable trained over the section 56 of the double pulley and extended through an eye 58 on the side wall 48, and from the eye to a pulley 60 also on the side wall 48 and also mounted to be rotated by the hand crank 52.

One end of the cover is anchored to the inner end wall 62 of the truck body by a cleat 64 which is secured to the end wall by screws 66 which extend through the cleat and cover. The opposite end of the cover is secured to the shaft 14 and as the shaft is rolled outwardly the cover is spread over grain or other cargo in the truck body. With the cover in the extended position the cables 24 and 28 which extend through the grommets are secured over hooks 68 on the side walls of the truck body, and a similar cable 70 extended through grommets 72 in the end of the cover is secured over hooks 74 in the end wall 76 of the body.

The grommets 72 in the end of the cover are positioned in a flap 78 and the end of the cover is secured to the shaft 14 by a cleat 80 which is mounted on the shaft by screws 82.

Figure 6:
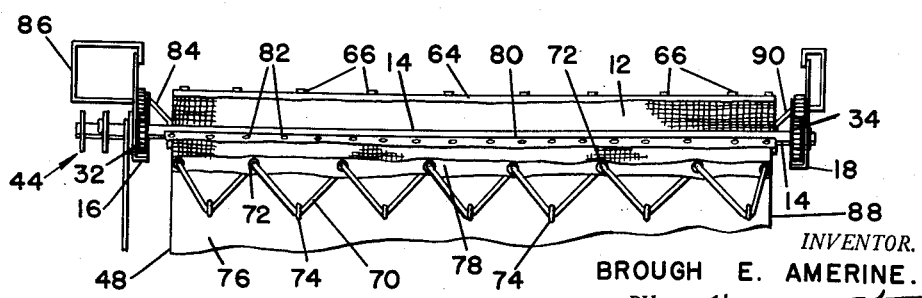
Figure 6 is an end elevational view showing the upper portion of a vehicle body with the lower part thereof broken away, and illustrating the method of fastening the cover to the body.

The rails 16 and 18 are L-shaped in cross section and the chains 36 and 38 are positioned on the horizontally disposed sections thereof. The rail 16 is secured to the side wall 48 of the truck body by brackets 84 and, as shown in Figure 6, a box-like bracket 86 extends from one of the brackets 84 and provides a cover for the double pulley 44. The rail 18 is also supported from the side wall 88 on the opposite side of the body by brackets 90 and the brackets are secured to the side wall by bolts 92.

The pulley 50 on the side wall 48 of the truck body is mounted on the wall by a bracket 94 and the end of the pulley is provided with pins 96 and 98 upon which holes 100 on the section 102 of the crank are received to facilitate winding the cable. The pulley 60 at the opposite end of the wall 48 is mounted by a bracket 104, and the pulley is provided with pins 106 and 108, similar to the pins 96 and 98 of the pulley 50, so that the same crank may be used to rotate both pulleys.

Figure 2:
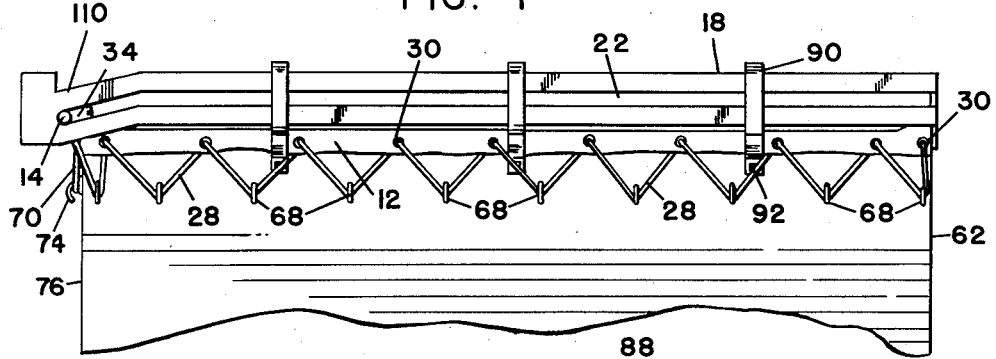
Figure 2 is an elevational view similar to that shown in Figure 1, showing the cover extended over the upper portion of the vehicle body, and also with part of the body broken away.

As illustrated in Figures 1 and 2, the rails at the trailing end of the truck body are provided with inclined sections 110 so that the shaft and flap 78 drop downwardly to facilitate fastening the end of the cover at the rear of the body.

Figures 3, 4:
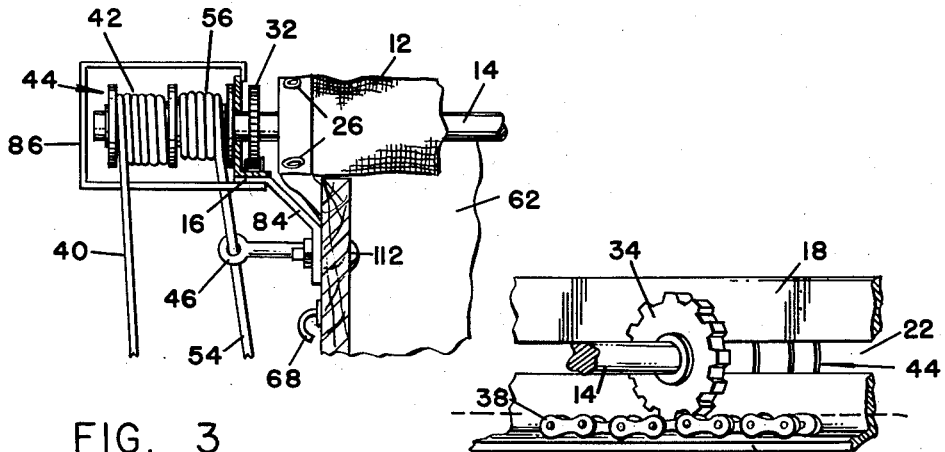
Figure 3 is a cross section through the side wall of a body on which the cover operating means is installed taken on line 3—3 of Figure 1 showing, in particular the pulleys on the end of the cover mounting shaft, and over which the cover operating cables are trained.
Figure 4 is a sectional view showing one of the sprockets on the ends of the cover shaft and illustrating the manner in which the sprockets mesh with chains in rails on upper edges of the side walls of a vehicle body.
Figure 5:
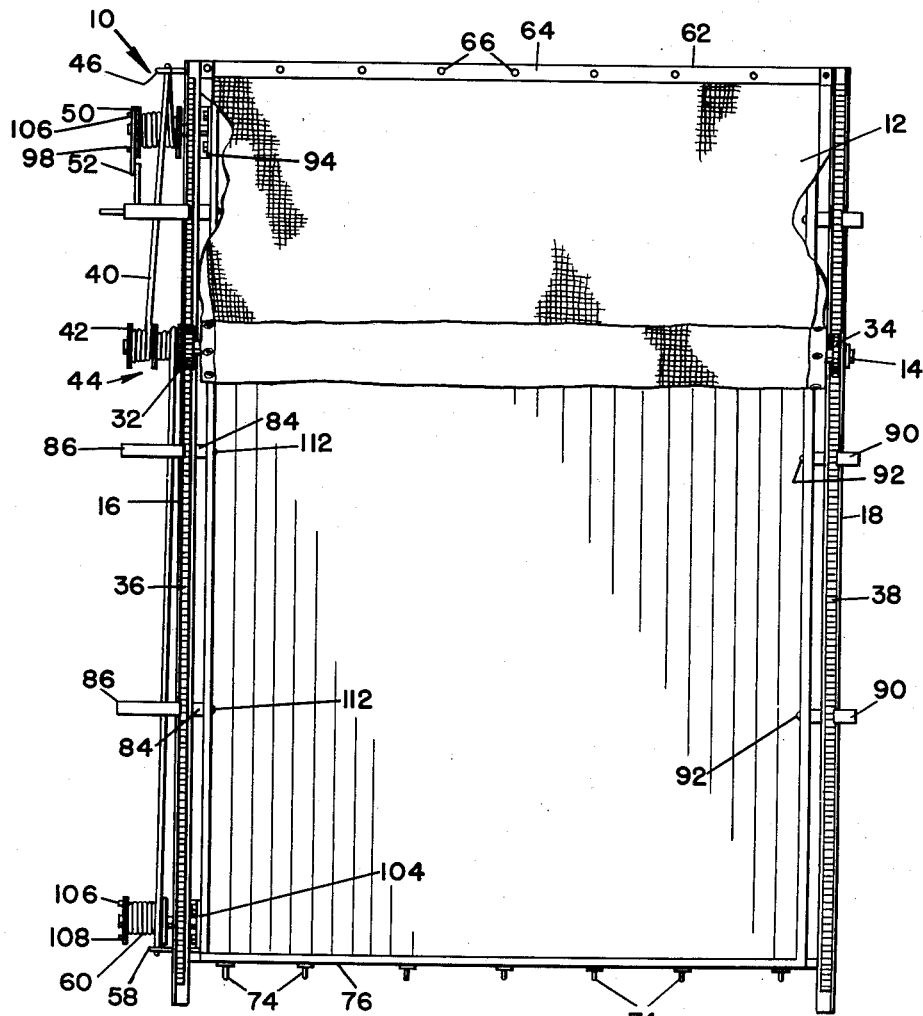
Figure 5 is a plan view of a vehicle body with other parts omitted, and showing the improved cover of this invention extended over the body.

It is preferred to mount the brackets for holding the rails on the sides of the truck body by bolts 112, as shown in Figure 3, however, the rails may be mounted on the side walls by other suitable means.

*Operation*

With the parts as illustrated in Figure 1, the crank 52 is rotated in the direction of the arrow 114 whereby the cable 40 rotates the shaft 14 winding the cover 12 thereon to open the truck body, and with the crank on the pulley 60 and rotated in the direction of the arrow 116 the cable 54 rotates the shaft 14, unwinding the cover and positioning the cover over cargo in the vehicle. After positioning the cover over the vehicle the sides are secured to the side walls of the vehicle body, and the rear end is secured to the end wall or tailgate of the body by the cables and hooks as hereinbefore described.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and arrangement of details and parts, such as come within the purview of the invention claimed may be resorted to in actual practice, if desired.

Having now described the invention that which is claimed to be new and desired to be procured by Letters Patent, is:

1. In a cover, the combination which comprises, an open vehicle body, the body having side and end walls, a tarpaulin positioned with one end secured to one end of the body, rails having elongated slots therein, means for mounting the rails on upper edges of the side walls of the body, chains in the rails, a transversely disposed shaft positioned with the ends thereof extended into the slots of the rails, sprockets on the shaft and positioned in meshing relation with the chains of the rails, means for securing the sides of the cover to the side walls of the body, means for securing the end of the tarpaulin opposite to the end secured to the end of the body to the shaft, a double pulley on one end of the shaft, pulleys rotatably mounted on opposite ends of the body, cables trained over the pulleys, and hand crank actuating means for rotating the pulleys to wind and unwind the cover.

2. In a vehicle body cover, the combination which comprises a tarpaulin designed to provide a cover for open truck and railway car bodies, the bodies having side and end walls, means for anchoring one end of the cover to one end wall of the body, grommets in the sides and end of the cover opposite to the end anchored to the end wall of the body, cables threaded through the grommets, hooks on the walls of the body and positioned to receive the cables, rails having elongated slots therein, means for mounting the rails on the upper edges of the side walls of the body, chains positioned in the rails, a shaft extended across the cover and positioned with the ends in the slots of the rails, sprockets on the ends of the shaft and positioned in meshing relation with the chains of the rails, a double pulley on one end of the shaft, pulleys rotatably mounted on the opposite ends of the body and aligned with sections of the double pulley, cables trained over sections of the double pulley and pulleys mounted on the body, and a hand crank for operating the pulleys to extend and retract the cover.

References Cited in the file of this patent

UNITED STATES PATENTS

| | | |
|---|---|---|
| 1,729,555 | Sparshott | Sept. 24, 1929 |
| 1,963,830 | Corbet | June 19, 1934 |
| 2,581,985 | Tuerk | Jan. 8, 1952 |

FOREIGN PATENTS

| | | |
|---|---|---|
| 693,979 | Great Britain | July 8, 1953 |